(12) United States Patent
Sabripour et al.

(10) Patent No.: US 9,396,397 B2
(45) Date of Patent: Jul. 19, 2016

(54) METHODS AND SYSTEMS FOR OBJECT-RECOGNITION AND LINK INTEGRATION IN A COMPOSITE VIDEO STREAM

(71) Applicant: MOTOROLA SOLUTIONS, INC, Schaumburg, IL (US)

(72) Inventors: Shervin Sabripour, Plantation, FL (US); Alejandro G Blanco, Fort Lauderdale, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/519,715

(22) Filed: Oct. 21, 2014

(65) Prior Publication Data

US 2016/0110612 A1 Apr. 21, 2016

(51) Int. Cl.
*G06K 9/00* (2006.01)
*G06T 7/20* (2006.01)
*G06F 17/30* (2006.01)

(52) U.S. Cl.
CPC ...... *G06K 9/00765* (2013.01); *G06F 17/30784* (2013.01); *G06F 17/30823* (2013.01); *G06K 9/00228* (2013.01); *G06K 9/00288* (2013.01); *G06K 9/00711* (2013.01); *G06K 9/00751* (2013.01); *G06T 7/20* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| 8,358,342 B2 | 1/2013 | Park |
| 8,433,136 B2 | 4/2013 | Epshtein et al. |
| 2006/0078047 A1* | 4/2006 | Shu ............... G06F 17/3079 375/240.01 |
| 2011/0292232 A1* | 12/2011 | Zhang ............ G06F 17/30247 348/222.1 |
| 2012/0045090 A1* | 2/2012 | Bobbitt ........... G06K 9/00771 382/103 |
| 2013/0170557 A1* | 7/2013 | Wang .............. H04N 19/00 375/240.24 |
| 2013/0254816 A1 | 9/2013 | Kennedy et al. |
| 2013/0322684 A1 | 12/2013 | Kritt et al. |
| 2014/0056477 A1 | 2/2014 | Pakulski et al. |

FOREIGN PATENT DOCUMENTS

| GB | 2482067 A | 1/2012 |
| WO | 2013003351 A2 | 1/2013 |

OTHER PUBLICATIONS

Wongun Choi, et al. "Multi-Target Tracking With Single Moving Camera", Aug. 7, 2012; 2 Pages.
Yaser Sheikh, et al. "Background Subtraction for Freely Moving Cameras", 2009; 7 Pages.

* cited by examiner

*Primary Examiner* — Stephen R Koziol
*Assistant Examiner* — Amandeep Saini
(74) *Attorney, Agent, or Firm* — Daniel R. Bestor

(57) ABSTRACT

Disclosed herein are methods and systems for object recognition and link integration in a composite video stream. One embodiment takes the form of a process that includes detecting an object of interest in a set of video frames. The process also includes tracking the movements of the detected object of interest across a subset of the video frames in the set of video frames. The process further includes generating a composite video stream from the video frames in the subset. The composite video stream shows the tracked movements of the detected object of interest without showing background data from the video frames in the subset. The process also includes outputting the generated composite video stream.

20 Claims, 6 Drawing Sheets

METHODS AND SYSTEMS FOR OBJECT-RECOGNITION AND LINK INTEGRATION IN A COMPOSITE VIDEO STREAM

BACKGROUND OF THE INVENTION

The process of object recognition is one of the most widely used video-analysis and image-analysis techniques employed today. In the public-safety context, a vast amount of visual data is obtained on a regular, indeed often substantially continuous basis, from a plurality of sources. Oftentimes one would wish to identify, e.g., a person of interest in these images and recordings. It could be the case that the quick and accurate identification of said person of interest is of paramount importance to the safety of the public, whether in an airport, a train station, a high-traffic outdoor space, or some other location. Among other benefits, object recognition can enable public-safety responders to identify objects of interest promptly and correctly. It is often the case, however, that the quantity of the video frames being input to—and analyzed by—object-recognition software is correlated with the ability to rapidly view and quickly interpret the results. Lengthy videos cannot be studied in their entirety due to time constraints and even a time-lapse representation still suffers from a persistent problem (i.e., the video is not relevant when the object of interest is absent).

To reduce the negative impact of excess video, various object of interest extraction tools can be used. One limited category of such tools relies on fixed camera position and orientation. Accordingly, for this reason and others, there is a need for methods and systems for object recognition and link integration in a composite video stream.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
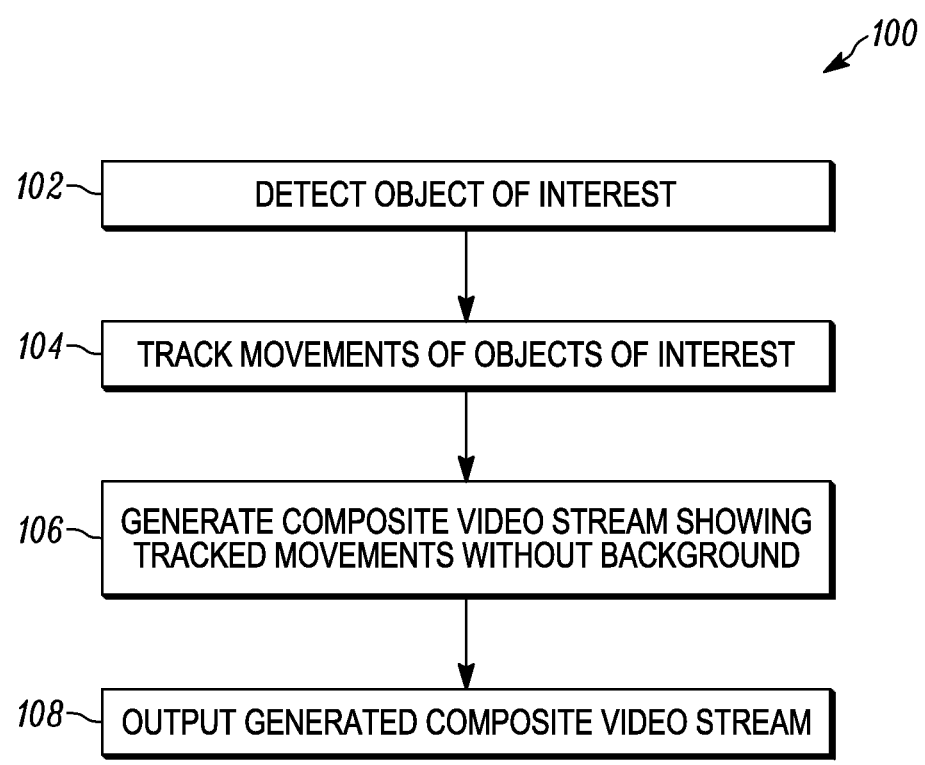
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for object recognition and link integration in a composite video stream. One embodiment takes the form of a process that includes detecting an object of interest in a set of video frames. The process also includes tracking the movements of the detected object of interest across a subset of the video frames in the set of video frames. The process further includes generating a composite video stream from the video frames in the subset. The composite video stream shows the tracked movements of the detected object of interest without showing background data from the video frames in the subset. The process also includes outputting the generated composite video stream.

Another embodiment takes the form of a system that includes a communication interface, a processor, and data storage containing instructions executable by the processor for causing the system to carry out at least the process described in the preceding paragraph. In at least one embodiment, the system further includes a user interface. In at least one embodiment, the system further includes an imaging module for capturing the set of video frames.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the object of interest is a person. In at least one embodiment, the object of interest includes a feature of a person. In at least one embodiment, the object of interest is a weapon.

In at least one embodiment, the object of interest is a face of a person. In at least one such embodiment, detecting the object of interest in the set of video frames includes using at least one of a facial-detection engine and a facial-recognition engine to detect the object of interest in the set of video frames.

In at least one embodiment, the object of interest is a vehicle. In at least one such embodiment, detecting the object of interest in the set of video frames includes using at least one optical-character-recognition (OCR) engine to detect the object of interest in the set of video frames.

In at least one embodiment, the object of interest is a set of multiple objects of interest.

In at least one embodiment, the set of video frames includes video frames from multiple different video sources, and wherein detecting the object of interest in the set of video frames includes detecting the object of interest in video frames from more than one of the multiple different video sources. In at least one such embodiment, the multiple different video sources include multiple different video cameras. In at least one other such embodiment, at least one of the multiple different video sources is a data store containing previously recorded video. In at least one embodiment, the set of video frames includes video frames from at least one mobile video camera. In at least one embodiment, the set of video frames includes video frames from at least one video camera that is in motion while capturing video.

In at least one embodiment, outputting the generated composite video stream includes outputting the generated composite video stream for display on at least one user interface. In at least one embodiment, outputting the generated composite video stream includes outputting the generated composite video stream for storage in at least one data store.

In at least one embodiment the process further includes identifying a set of attributes of the detected object of interest, generating an identifier from the identified set of attributes, and storing the generated identifier in association with the generated composite video stream. In at least one such embodiment, storing the generated identifier in association with the generated composite video stream includes storing the composite video stream in a searchable database of such generated composite video streams, the searchable database being indexed by such generated identifiers.

In at least one embodiment, the searchable database is searchable using data masks of the identifiers by which the searchable database is indexed. In at least one such embodiment, the process further includes receiving a query that includes at least one of an object-of-interest identifier and a data mask of an object-of-interest identifier, and responsively returning search results including one or more generated composite videos having associated identifiers that match at least one of an identifier from the query and a data mask from the query.

In at least one embodiment, generating the composite video stream includes including links in the composite video stream to corresponding portions of the subset of video frames. In at least one embodiment, generating the composite video stream includes including searchable metadata in the composite video stream, the searchable metadata including at least one of time data and location data.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example process, in accordance with an embodiment. The example process 100 includes steps 102-108 and describes functionality similar to that described below in connection with FIG. 2. The example process 100 described below may be carried out by a system, which includes a communication interface, a processor, and data storage containing instructions executable by the processor for causing the system to carry out the described functions.

At step 102, the process includes detecting an object of interest in a set of video frames. In at least one embodiment, the object of interest is a person. In at least one embodiment, the object of interest includes a feature of a person. In at least one embodiment, the object of interest is a face of a person. In at least one such embodiment, detecting the object of interest in the set of video frames includes using at least one of a facial-detection engine and a facial-recognition engine to detect the object of interest in the set of video frames. In at least one other embodiment, the object of interest is a weapon.

In at least one embodiment, the object of interest is a vehicle and in at least one such embodiment, detecting the object of interest in the set of video frames includes using at least one OCR engine to detect the object of interest in the set of video frames.

At step 104, the process includes tracking the movements of the detected object of interest across a subset of the video frames in the set of video frames, where that subset includes frames that include the detected object of interest.

In at least one example, the subset of video frames includes images taken from a stationary video-capture device. In at least one such embodiment, there is a stationary background and or substantially suitable point of reference identifiable in the subset of video frames. With regards to the example discussed immediately above, in at least one embodiment, known object-tracking techniques are employed to track the movements of the detected object of interest.

In at least one example, the subset of video frames includes images taken from a stationary video-capture device. In at least one such embodiment, there is not a stationary background and or substantially suitable point of reference identifiable in the subset of video frames. In another example, the subset of video frames includes images taken from a non-stationary video-capture device.

With regards to the various examples discussed in the preceding two paragraphs, in at least one embodiment, a set of attribute values is generated for the detected object of interest. A more detailed description of the various attributes in at least one embodiment is presented below in connection with FIG. 4. In at least one embodiment, the set of attribute values is substantially unique enough to identify the detected object of interest in the subset of video frames. In at least one such embodiment, tracking the movements of the detected object of interest includes using at least the set of attribute values to track the movements of the detected object of interest. In at least one other such embodiment, tracking the movements of the detected object of interest includes indirectly using at least the set of attribute values to track the movements of the detected object of interest by employing a unique identifier (unique ID) that is generated at least in part from the set of attribute values. A more detailed description of the unique ID in some embodiments is presented below in connection with FIG. 4.

Figure 2:
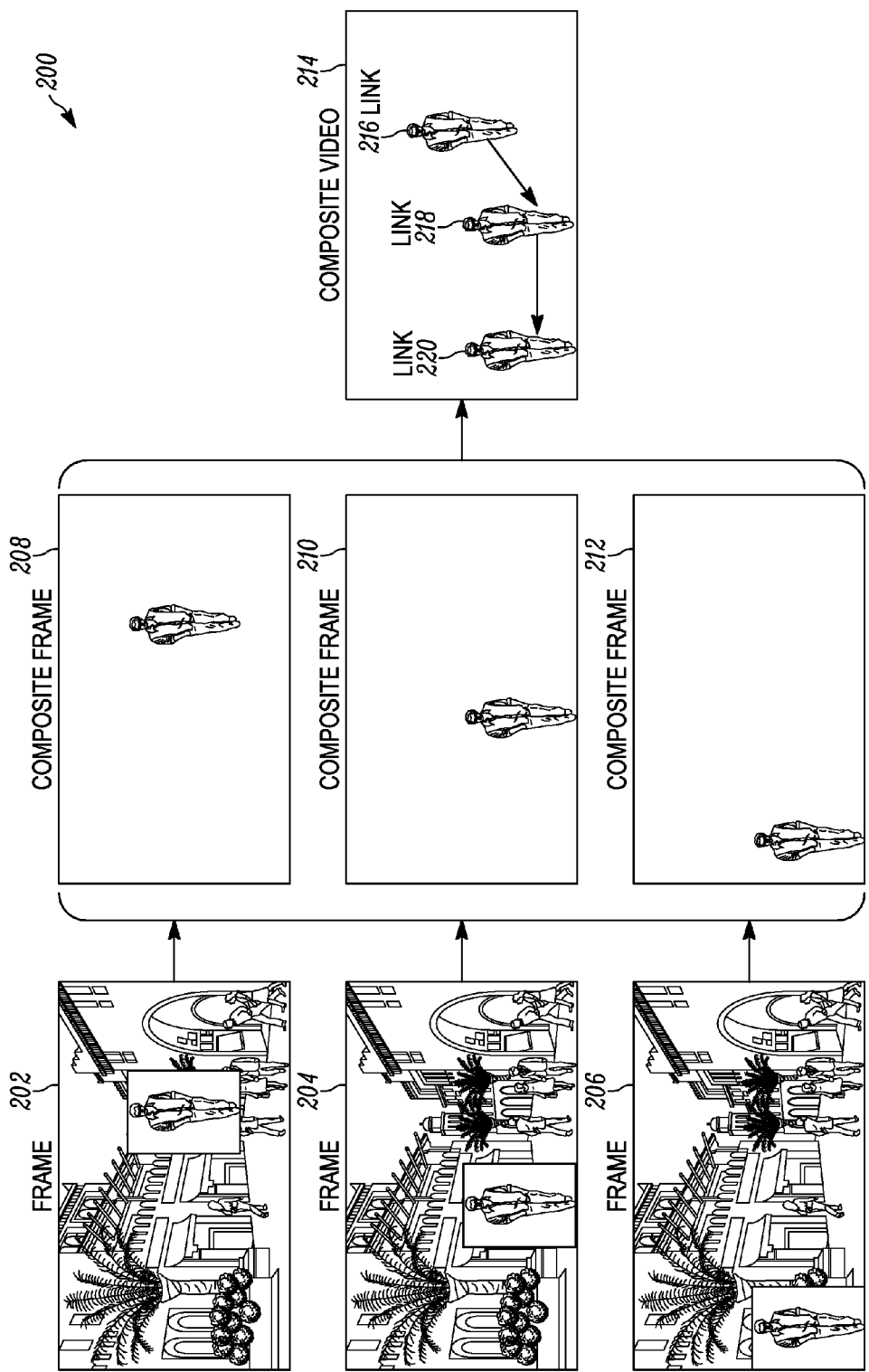
FIG. 2 depicts a first example conceptual overview of the presently disclosed methods and systems, in accordance with an embodiment.

At step 106, the process includes generating a composite video stream from the video frames in the subset. The composite video stream shows the tracked movements of the detected object of interest without showing background data from the video frames in the subset. In at least one embodiment, the composite video stream displays only the detected object of interest or a symbol representing the detected object of interest and tracked movements. A visual example of this aspect is depicted in FIG. 2. In at least one embodiment, information associated with the detected object of interest is displayed, such as timestamp information, location information, a public threat level, and/or various other relevant data.

At step 108, the process includes outputting the generated composite video stream. In at least one embodiment, outputting the generated composite video stream includes storing the generated composite video stream in a database. In at least one such embodiment, storing the generated composite video stream in a database further includes storing the set of video frames and linking the set of video frames with the generated compositing video stream. In at least one embodiment, outputting the generated composite video stream includes presenting the generated composite video stream on a display.

FIG. 1 can be thought of as a primer. It is included for at least the reason that it briefly introduces steps that are discussed hereafter in greater detail; indeed, the process 100 that is depicted in FIG. 1 is included to aid the reader in ascertaining an introductory understanding of the nature of this disclosure. It is provided by way of example and not limitation, as an introductory guide for the reader.

In the following figure descriptions, more detail is provided with respect to various process steps and their respective associated functionality. The concepts introduced in FIG. 1 are described and elaborated on within the context of conceptual overviews that highlight various aspects of the present methods and systems.

FIG. 2 depicts a first example conceptual overview of the present methods and systems, in accordance with an embodiment. In particular, FIG. 2 depicts a conceptual overview 200 wherein a subset of frames, frames 202-206, are used to generate composite frames 208-212 that are compiled into a composite video 214. The composite frame 208 depicts a detected object of interest at the time the frame 202 was captured. In the conceptual overview 200, the detected object of interest is a person. The person is outlined in the frames 202-206 for the sake of visual clarity. The composite frame 210 depicts the detected object of interest at the time the frame 204 was captured. The composite frame 212 depicts the detected object of interest at the time the frame 206 was captured. In FIG. 2, the composite frames 208-212 depict the detected object of interest and do not depict the respective backgrounds found in the frames of the subset. Each composite frame, frame 208-212, is used to generate the composite video 214.

The composite video 214 depicts the movements of the detected object of interest. In the conceptual overview 200, the composite video 214 shows the three composite frames 208-212 and respective links 216-220. In at least one embodiment, generating the composite video stream includes including links in the composite video stream to corresponding portions of the subset of video frames. The link 216 is a link (e.g., a hyperlink) to the frame 202. The link 218 links to the frame 204. The link 220 links to the frame 206. In at least one embodiment, when a link is clicked a user is shown the temporally associated frame.

Of course, a number other than three frames and respectively associated composite frames could be used in various different embodiments, as three is used purely by way of example and not limitation in FIG. 2.

Figure 3:
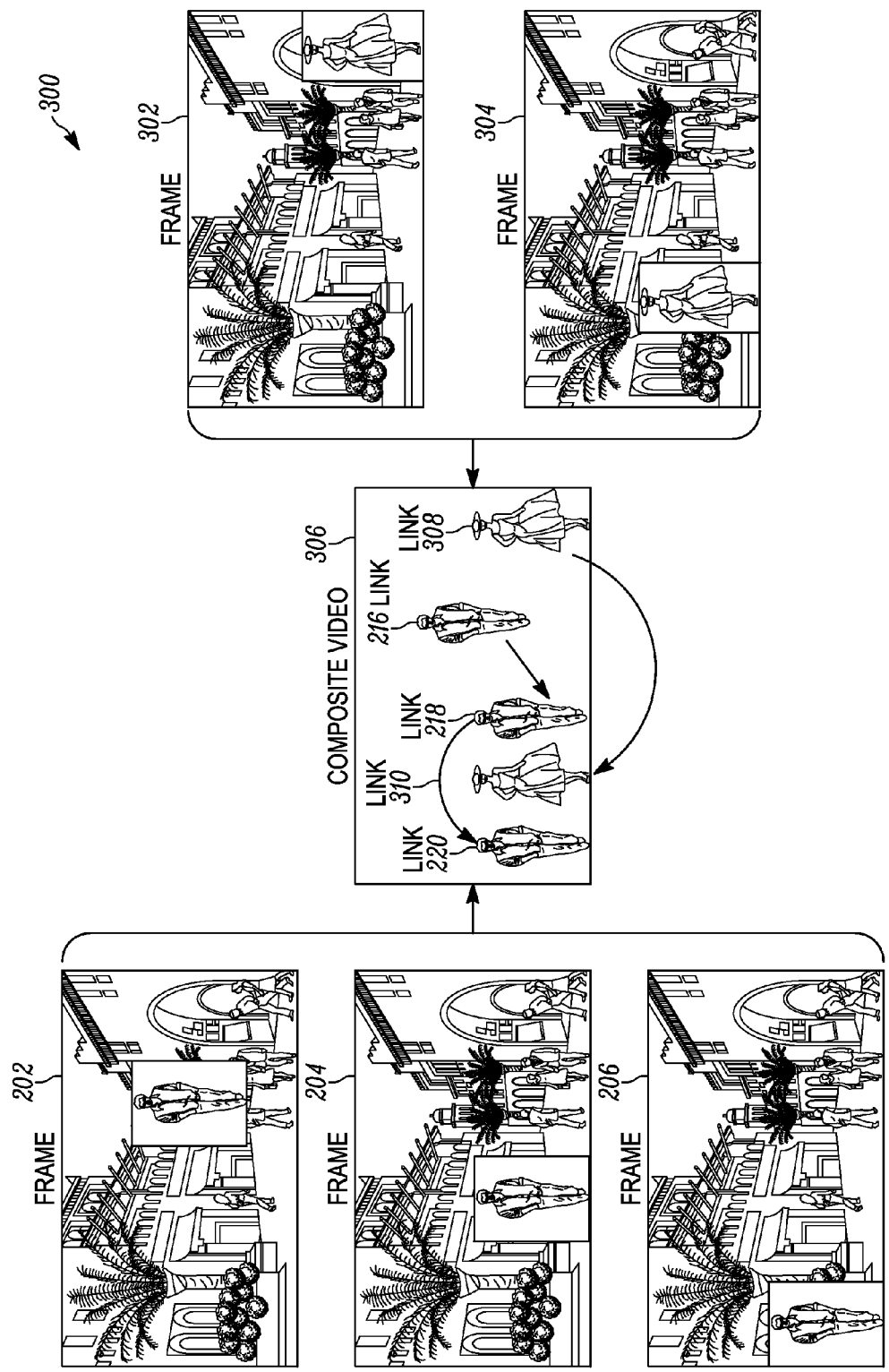
FIG. 3 depicts a second example conceptual overview of the presently disclosed methods and systems including a plurality of video sources and objects of interest, in accordance with an embodiment.

FIG. 3 depicts a second example conceptual overview of the presently disclosed methods and systems including a plurality of video sources and objects of interest, in accordance with an embodiment. In particular, FIG. 3 depicts a conceptual overview 300 wherein a subset of frames, frames 202-206 of FIG. 2 as well as frames 302-304, are used to generate a composite video 306. In FIG. 3, depictions of composite frames, analogous to the composite frames 208-212 of FIG. 2, are omitted for the sake of simplicity. In at least one embodiment, the object of interest is a set of multiple objects of interest. The conceptual overview 300 depicts a man and a woman as both being objects of interest.

In at least one embodiment, the set of video frames includes video frames from multiple different video sources, and detecting the object of interest in the set of video frames includes detecting the object of interest in video frames from more than one of the multiple different video sources. In at least one such embodiment, the multiple different video sources include multiple different video cameras. In at least one other such embodiment, at least one of the multiple different video sources is a data store containing previously recorded video. In at least one embodiment, the set of video frames includes video frames from at least one mobile video camera. In at least one embodiment, the set of video frames includes video frames from at least one video camera that is in motion while capturing video.

In the conceptual overview 300, the frames 302-304 show a woman as one of the objects of interest. The man from FIG. 2 is still an object of interest as well. The frames 302-304 were captured by a different video camera than the one used to capture the frames 202-206. The frames 302-304 were captured at a different time than the frames 202-206. In the conceptual overview 300, the frames 302-304 were captured at the same location as the frames 202-206. The composite video 306 depicts the movements of the detected objects of interest (the man and the woman). In the conceptual overview 300, the composite video 306 shows the identified objects of interest and respective links 216-220 and 308-310. The link 216 is a link (e.g., a hyperlink) to the frame 202. The link 218 links to the frame 204. The link 220 links to the frame 206. The link 308 links to the frame 302. The link 310 links to the frame 304. In at least one embodiment, when a link is clicked a user is shown the temporally associated frame. In at least one embodiment, when a link is clicked a user is shown a video that the temporally associated frame came from.

Figure 4:
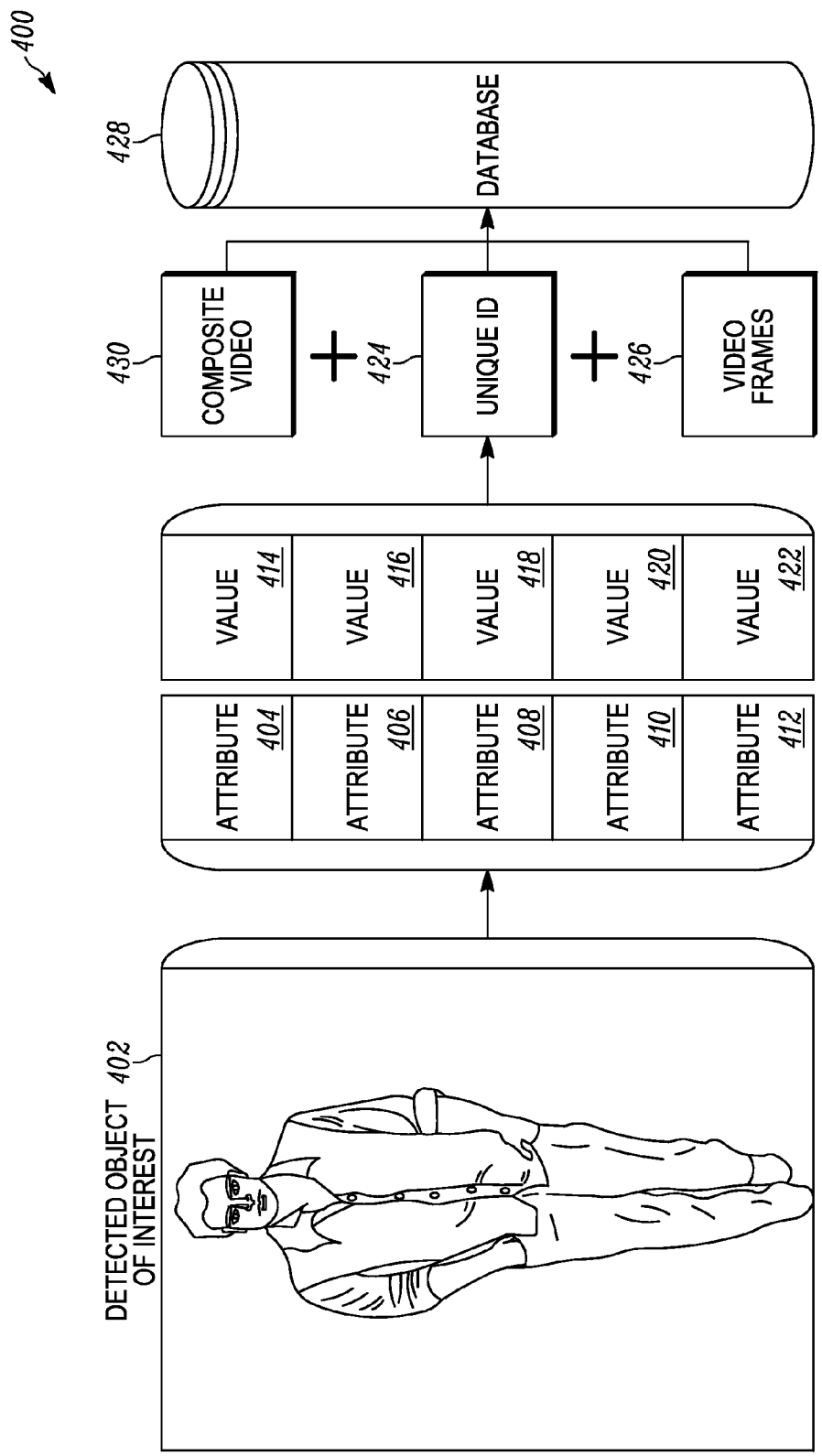
FIG. 4 depicts a database upload conceptual overview, in accordance with an embodiment.

FIG. 4 depicts a database upload conceptual overview, in accordance with an embodiment. In particular, FIG. 4 depicts a conceptual overview 400. In at least one embodiment, the process described herein further includes (i) identifying a set of attribute values, values 414-422, that correspond with a set of attributes, attributes 404-212, of a detected object of interest 402, (ii) generating an unique ID 424 from the identified values 414-422, and (iii) storing the generated unique ID 424 in association with a generated composite video 430. In at least one embodiment, the process further includes storing the generated unique ID 424 and the generated composite video 430 in association with a set of video frames 426, wherein the composite video 430 is derived at least in part from the video frames 426.

In at least one embodiment, storing the unique ID 424 in association with the generated composite video 430 includes storing the composite video 430 in a searchable database 428 of such generated composite videos, the searchable database 428 being indexed by such generated unique IDs. In at least one embodiment, generating the composite video 430 includes including searchable metadata in the composite video 430, the searchable metadata including at least one of time data and location data. In at least one embodiment, outputting the generated composite video 430 includes outputting the generated composite video 430 for storage in at least one data store (i.e., the database 428).

In at least one embodiment, various unique ID values are representative of associated attribute values. In at least one embodiment, a certain unique ID is similar to another unique ID if the respective associated values which generated each unique ID are also similar. In such an embodiment, detecting and or tracking an object of interest based at least in part on a unique ID, includes utilizing a unique ID range to detect and or track the object of interest.

Figure 5:
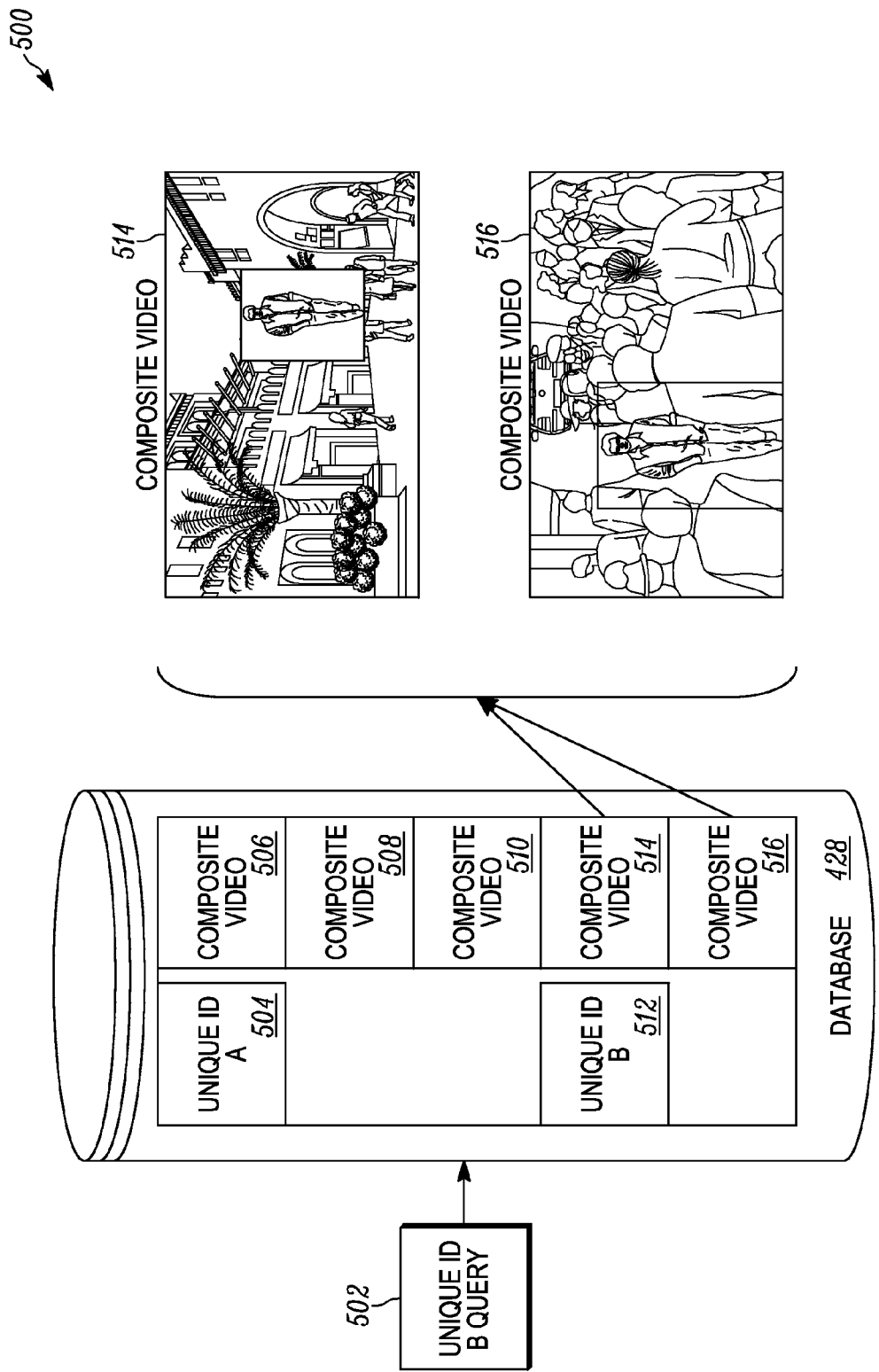
FIG. 5 depicts a database query conceptual overview, in accordance with an embodiment.

FIG. 5 depicts a database query conceptual overview, in accordance with an embodiment. In particular, FIG. 5 depicts a conceptual overview 500. The conceptual overview 500 highlights some of the inputs and outputs of a database query. The database 428 includes composites videos 506-510 and 514-516, which are indexed by unique IDs, unique ID "A" 504 and unique ID "B" 512.

In at least one embodiment, the process described herein further includes receiving a unique ID B query 502 that includes at least one of an object-of-interest identifier (the unique ID B 512) and a data mask of an object-of-interest identifier, and responsively returning search results including one or more generated composite videos (composite videos 514-516) having associated identifiers that match at least one of an identifier from the query and a data mask from the query. In at least one embodiment, the searchable database 428 is searchable using data masks of the identifiers by which the searchable database 428 is indexed.

In at least one embodiment, receiving a unique ID query includes receiving a unique ID range query. In such an embodiment, the process further includes responsively returning search results including one or more generated composite videos and video frames, each having associated unique IDs that fall within the unique ID range from the unique ID range query. As a result, system users may increase or decrease a number of search results by respectively increasing or decreasing the unique ID range of the unique ID range query.

In the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Figure 6:
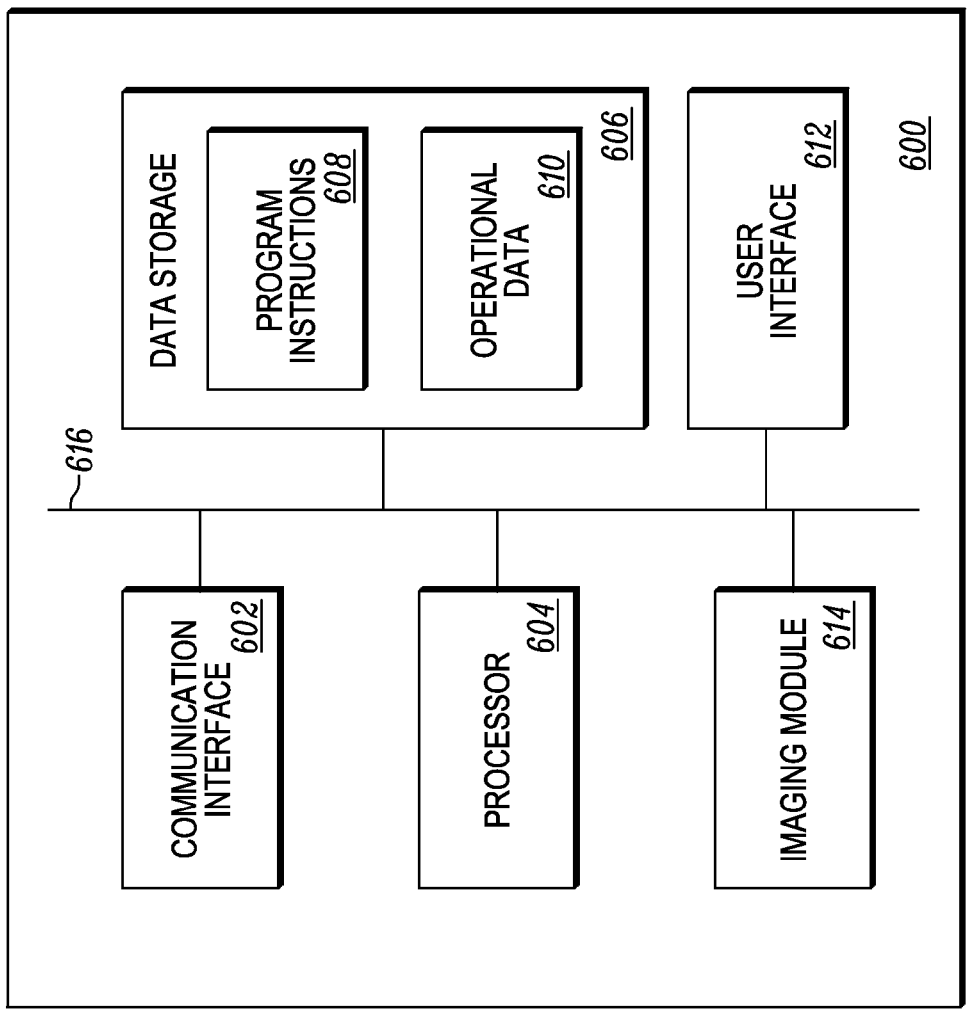
FIG. 6 depicts an example computing-imaging-communication device (CICD), in accordance with an embodiment.

FIG. 6 depicts an example computing-imaging-communication device (CICD), in accordance with an embodiment. Another embodiment takes the form of a system that includes a communication interface, a processor, and data storage containing instructions executable by the processor for causing the system to carry out a set of functions. The set of functions includes detecting an object of interest in a set of video frames, tracking the movements of the detected object of interest across a subset of the video frames in the set of video frames, generating a composite video stream from the video frames in the subset, the composite video stream showing the tracked movements of the detected object of interest, and outputting the generated composite video stream.

In at least one embodiment, the system further includes a user interface. In at least one embodiment, the system further includes an imaging module for capturing the set of video frames.

The example CICD 600 is depicted as including a communication interface 602, a processor 604, a data storage 606, a user interface 612, and an optional imaging module 614, all of which are communicatively coupled with one another via a system bus (or other suitable connection, network, or the like) 616. As a general matter, the example CICD 600 is presented as an example system that could be programmed and configured to carry out the functions described herein.

The communication interface 602 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 602 may include any necessary hardware (e.g., chipsets, antennas, Ethernet cards, etc.), any necessary firmware, and any necessary software for conducting one or more forms of communication with one or more other entities as described herein. The processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 6, the data storage 606 contains program instructions 608 executable by the processor 604 for carrying out various functions and operational data 610. In an embodiment in which a computing system such as the example CICD 600 is arranged, programmed, and configured to carry out methods such as the method 200 described herein, the program instructions 608 are executable by the processor 604 for carrying out those functions; in instances where other entities described herein have a structure similar to that of the example CICD 600, the respective program instructions 608 for those respective devices are executable by their respective processors 604 to carry out functions respectively performed by those devices.

The user interface 612 may include one or more input devices (a.k.a. components and the like) and/or one or more output devices. With respect to input devices, the user interface 612 may include one or more touchscreens, buttons, switches, microphones, and the like. With respect to output devices, the user interface 612 may include one or more displays, speakers, light emitting diodes (LEDs), and the like. In at least one embodiment, outputting the generated composite video stream includes outputting the generated composite video stream for display on at least one user interface. Moreover, one or more components (e.g., an interactive touchscreen-and-display component) of the user interface 612 could provide both user-input and user-output functionality. And certainly other user-interface components could be implemented in a given context, as known to those of skill in the art.

The optional imaging module 614 may include one or more imaging sensors such as a camera sensor, a video camera sensor, a depth sensor, a light field sensor and the like. In at least one embodiment, the set of video frames is captured by the imaging module 614. In at least one embodiment, the set of video frames is captured by an imaging module of another device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method including:
    detecting an object of interest in a set of a plurality of video frames from one or more video sources;
    tracking movements of the detected object of interest across a plurality of subset video frames out of the plurality of video frames less than the plurality of video frames;
    generating and storing a new composite video stream from the plurality of subset video frames by removing background data from the plurality of subset video frames and adding links in the composite video stream to corresponding subset video frames that link the subset video frame with background data removed in the composite video stream to the respective video frame from the one or more video sources without its background data removed, the generated composite video stream showing the tracked movements of the detected object of interest across the plurality of subset video frames without showing the removed background data and including links to respective video frames from the one or more video sources without its background data removed; and
    outputting the generated composite video stream.

2. The method of claim 1, wherein the object of interest is a person.

3. The method of claim 1, wherein the object of interest is a face of a person.

4. The method of claim 3, wherein detecting the object of interest in the set of video frames comprises using at least one of a facial-detection engine and a facial-recognition engine to detect the object of interest in the set of video frames.

5. The method of claim 1, wherein the object of interest comprises a feature of a person.

6. The method of claim 1, wherein the object of interest is a set of multiple objects of interest.

7. The method of claim 1, wherein the set of video frames includes video frames from multiple different video sources, and wherein detecting the object of interest in the set of video frames comprises detecting the object of interest in video frames from the multiple different video sources.

8. The method of claim 7, wherein the multiple different video sources comprise multiple different video cameras.

9. The method of claim 7, wherein at least one of the multiple different video sources is a data store containing previously recorded video.

10. The method of claim 1, wherein outputting the generated composite video stream comprises outputting the generated composite video stream including visible actionable hyperlinks to the respective plurality of video frames for display on at least one user interface.

11. The method of claim 10, wherein the visible actionable hyperlinks are shifted to track the movements of the detected object of interest in the composite video stream.

12. The method of claim 1, wherein storing the generated composite video stream comprises storing the generated composite video stream in at least one data store.

13. The method of claim 1, further comprising:
    identifying a set of attributes of the detected object of interest;

generating an identifier from the identified set of attributes; and storing the generated identifier in association with the generated composite video stream.

14. The method of claim 13, wherein storing the generated identifier in association with the generated composite video stream comprises storing the composite video stream in a searchable database of such generated composite video streams, the searchable database being indexed by such generated identifiers.

15. The method of claim 14, wherein the searchable database is searchable using data masks of the identifiers by which the searchable database is indexed.

16. The method of claim 14, further comprising receiving a query that includes at least one of an object-of-interest identifier and a data mask of an object-of-interest identifier, and responsively returning search results comprising one or more generated composite videos having associated identifiers that match at least one of an identifier from the query and a data mask from the query.

17. The method of claim 1, wherein generating the composite video stream comprises including searchable metadata in the composite video stream, the searchable metadata comprising at least one of time data and location data.

18. A system comprising:
   a communication interface;
   a processor; and
   data storage containing instructions executable by the processor for causing the system to carry out a set of functions, the set of functions including:
   detecting an object of interest in a set of a plurality of video frames from one or more video sources;
   tracking movements of the detected object of interest across a plurality of subset video frames out of the plurality of video frames less than the plurality of video frames;
   generating and storing a new composite video stream from the plurality of subset video frames by removing background data from the plurality of subset video frames and adding links in the composite video stream to corresponding subset video frames that link the subset video frame with background data removed in the composite video stream to the respective subset video frame from the one or more video sources without the background data removed, the generated composite video stream showing the tracked movements of the detected object of interest across the plurality of subset video frames without showing the removed background data and including links to respective video frames from the one or more video sources without its background data removed; and
   outputting the generated composite video stream.

19. The system of claim 18, wherein outputting the generated composite video stream comprises outputting the generated composite video stream including visible actionable hyperlinks to the respective plurality of video frames for display on at least one user interface.

20. The system of claim 19, wherein the visible actionable hyperlinks are shifted to track the movements of the detected object of interest in the composite video stream.

* * * * *